United States Patent [19]

Van Rheenen

[11] Patent Number: 5,679,732
[45] Date of Patent: Oct. 21, 1997

[54] ACRYLIC PRESSURE SENSITIVE ADHESIVES WITH CONTROLLED HUMIDITY RESPONSE

[75] Inventor: Paul Ralph Van Rheenen, Warminster, Pa.

[73] Assignee: Rohm and Haas Company, Phila, Pa.

[21] Appl. No.: 543,691

[22] Filed: Oct. 16, 1995

Related U.S. Application Data

[63] Continuation of Ser. No. 249,490, May 26, 1994, abandoned.

[51] Int. Cl.$^6$ ............................ C08F 220/18; C08L 5/00
[52] U.S. Cl. ..................... 524/21; 524/27; 524/388; 524/556; 524/560
[58] Field of Search ............................ 524/21, 25, 26, 524/27, 56, 388, 386, 387, 556, 560

[56] References Cited

U.S. PATENT DOCUMENTS

| | | | |
|---|---|---|---|
| 3,983,059 | 9/1976 | Sekmakas | 524/4 |
| 4,055,529 | 10/1977 | Burley | 524/388 |
| 4,341,680 | 7/1982 | Hauber | 524/360 |
| 4,548,845 | 10/1985 | Parsons et al. | 524/272 |
| 4,588,762 | 5/1986 | Mruk et al. | 524/45 |
| 5,264,475 | 11/1993 | Kissel | 524/211 |

FOREIGN PATENT DOCUMENTS 262786  12/1994  European Pat. Off. .

OTHER PUBLICATIONS

Co-pending U.S. application Serial No. 07/726,611, Filed Jul. 8, 1991, By Chol-yoo Choi, For "Printable Pressure Sensitive Adhesives Articles".

*Primary Examiner*—Christopher Henderson
*Attorney, Agent, or Firm*—Joseph F. Leightner; David T. Banchik

[57] ABSTRACT

A pressure-sensitive adhesive composition includes from about 30 weight percent to about 70 weight percent solids in an aqueous medium. The solids include an acrylic polymer having a glass transition temperature of from about −25° C. to about −85° C. and having an acid number of from about 3 to about 30 and from about 0.75 parts by weight to about 5 parts by weight of a humectant per 100 parts polymer.

10 Claims, No Drawings

ACRYLIC PRESSURE SENSITIVE ADHESIVES WITH CONTROLLED HUMIDITY RESPONSE

RELATED APPLICATIONS

This application is a Continuation of Ser. No. 249,490, filed May 26, 1994, which has been abandoned.

The present invention is directed to pressure-sensitive adhesive compositions.

Pressure-sensitive adhesive compositions based on aqueous emulsions of acrylic polymers are known and widely used. The properties of some acrylic emulsion-based adhesive compositions are sensitive to variations in humidity and may provide varying performance when applied under conditions of different relative humidity.

The pressure-sensitive adhesive composition of the present invention includes from about 30 weight percent (wt %) to about 70 wt %, more preferably about 45 wt % to about 60 wt %, solids dispersed in an aqueous medium. The solids of the pressure-sensitive adhesive composition of the present invention include an acrylic polymer having a glass transition temperature ($T_g$) within a range of from about $-25°$ C. to about $-85°$ C., more preferably from about $-30°$ C. to about $-65°$ C. and having an acid number of from about 3 to about 30, and from about 0.75 parts by weight (pbw) to about 5 pbw, more preferably from about 1 pbw to about 3 pbw, still more preferably from about 1 pbw to about 2 pbw, per 100 pbw polymer of a humectant dissolved in the aqueous medium. The pressure-sensitive adhesive composition of the present invention exhibits reduced sensitivity to humidity.

As used herein the terminology "solids" refers collectively to all non-volatile components of an aqueous composition and the terminology "polymer solids" refers specifically to the acrylic polymer solids of an aqueous composition. The $T_g$ values set forth herein are based on measured values obtained, e.g., by differential scanning calorimetry of the respective polymer. As used herein, the terminology "acid number" means the number of milligrams (mg) of potassium hydroxide required to neutralize 1 gram of the polymer in an aqueous titration.

Suitable acrylic polymers are those including repeating units derived from an alkyl (meth)acrylate monomer, more preferably from a ($C_1$–$C_{20}$)alkyl (meth)acrylate monomer. As used herein the terminology "alkyl (meth)acrylate monomer" refers collectively to alkyl acrylate monomers and alkyl methacrylate monomers and the terminology "($C_1$–$C_{20}$)alkyl" denotes an alkyl substituent group having from 1 to 20 carbon atoms per group. Suitable ($C_1$–$C_{20}$)alkyl (meth)acrylate monomers include, for example, ethyl acrylate, butyl acrylate, 2-ethylhexyl acrylate, lauryl acrylate, cetyl acrylate, stearyl acrylate, eicosyl acrylate, methyl methacrylate, ethyl methacrylate, butyl methacrylate, isodecyl methacrylate, lauryl methacrylate, cetyl methacrylate, stearyl methacrylate, eicosyl methacrylate and mixtures thereof.

In a preferred embodiment, the acrylic polymer includes up to about 8.5 mole percent (mole %), and, more preferably, from about 0.5 mole % to about 5 mole %, repeating units derived from a monoethylenically unsaturated carboxylic acid monomer. As used herein the terminology "monoethylenically unsaturated" means having a single site of ethylenic unsaturation per molecule. Suitable monoethylenically unsaturated carboxylic acid monomers include, for example, acrylic acid, methacrylic acid, itaconic acid, crotonoic acid, fumaric acid and mixtures thereof. In a preferred embodiment, the monoethylenically unsaturated carboxylic acid monomer is acrylic add, methacrylic acid or a mixture thereof.

The acrylic polymer may, optionally, include up to about 40 wt %, preferably no more than about 20 wt %, repeating units derived from ethylenically unsaturated monomers that are copolymerizable with the above-disclosed ($C_1$–$C_{20}$)alkyl (meth)acrylate monomers such as, e.g., vinyl esters, e.g., vinyl acetate and vinyl aromatic monomers, such as, e.g., styrene and vinyl toluene, (meth)acrylamides, e.g., acrylamide and methacrylamide, and mixtures thereof.

The acrylic polymer may, optionally, be crosslinked during synthesis of the respective polymer, by including a small amount, for example, about 0.01 wt % to about 5 wt %, of a polyethylenically unsaturated monomer in the monomer mixture, wherein the terminology "polyethylenically unsaturated" means having two or more sites of ethylenic unsaturation per molecule. Suitable polyethylenically unsaturated monomers include, for example, allyl (meth)acrylate, diallyl phthalate, 1,4-butylene glycol di(meth)acrylate, trimethylolpropane tri(meth)acrylate, divinyl ketone, N,N'-methylenediacrylimide, the polyallyl and polyvinyl ethers of pentaerythritol and mixtures thereof.

The acrylic polymer can be made by various addition polymerization techniques for polymerizing ethylenically unsaturated monomers. Preferably, the polymer is made by a free-radical initiated aqueous emulsion polymerization. Such techniques are well known in the art.

Typically, the initiator and the monomers to be polymerized in the emulsion polymerization are added to an aqueous medium at controlled rates and the polymerization is carried out in the presence of a stabilizer.

Suitable free radical initiators include known peroxides, hydroperoxides, persulfates and azo initiators such as, for example, hydrogen peroxide, benzoyl peroxide, tert-butyl hydroperoxide, cumene peroxide, tert-butyl perbenzoate, tert-butyl diperphthalate and methyl ethyl ketone peroxide, ammonium persulfate, sodium persulfate, potassium persulfate, azodiisobutyronitrile and mixtures thereof. The initiators can be used alone, i.e., in a thermal initiation system, or, optionally, in combination with a reducing agent, i.e., in a redox initiation system. The initiator is preferably used at a level of from about 0.01 pbw to 3 pbw per 100 pbw total monomer charge. As used herein, the terminology "total monomer charge" means all monomers added to the aqueous medium during the course of the polymerization process.

Suitable stabilizers include, for example, from about 0.05 pbw to about 5 pbw per 100 pbw total monomer charge of an anionic surfactant or from about 0.1 pbw to about 10 pbw of a nonionic surfactant per 100 pbw total monomer charge. Suitable anionic surfactants include, for example, alkyl sulfates, alkyl phenol ethoxysulfates, alkyl sulfonates, alkaryl sulfonates and alkyl sulfosuccinates, such as, for example, sodium lauryl sulfate, nonyl phenol ethoxy(4) sulfate, sodium dodecyl benzene sulfonate, disodium dioctyl sulfosuccinate, as well as mixtures thereof. Suitable nonionic surfactants include, for example, ethoxylated alkyl phenols, poly(ethylene oxide/propylene oxide) block copolymers, such as, for example, ethoxylated(10–60 moles ethylene oxide) nonyl phenol, as well as mixtures thereof.

The molecular weight of the polymer may, optionally, be controlled in a conventional manner using a chain transfer agent. For example, up to about 10 pbw, more preferably, up to about 0.75 pbw of a chain transfer agent per 100 pbw total monomer charge. Suitable chain transfer agents include, for example, a $(C_2-C_{20})$alkyl mercaptans such as, for example, octyl mercaptan and dodecyl mercaptan, esters of mercaptopropionic acids such as, for example, methyl-3-mercaptopropionate and butyl-3-mercaptopropionate, may be introduced into the reaction vessel during the polymerization reaction.

Compounds that absorb or retain moisture and that are non-volatile and compatible with the acrylic polymer under the conditions of anticipated use are useful as the humectant of the adhesive composition of the present invention. Suitable humectants include, for example, urea and urea derivatives, polyols, including poly(oxyalkylene) glycols, ethoxylated polyols and propoxylated polyols, sugars, including ethoxylated sugars and propoxylated sugars, and protein-based humectants, such as, for example, urea, 1,3-butane diol, 1,2,6-hexanetriol, trimethylol propane, pentaerythritol, glycerol, polyethylene glycols having a molecular weight of from about 100 to about 4000, such as, for example, diethylene glycol and triethylene glycol, poly(ethylene oxide/propylene oxide) copolymers, sorbitol, glucose, sucrose, corn syrup, ethoxylated (10–40 moles ethylene oxide) glycerol, ethoxylated (10–40 moles ethylene oxide) glucose, propoxylated (10–40 moles propylene oxide) glucose, hydrolyzed soy protein, soluble collagen and mixtures thereof.

In a highly preferred embodiment, the humectant is urea, glycerol, a polyethylene glycol having a molecular weight of from about 100 to about 1000 or a mixture thereof.

The adhesive composition of the present invention is made by combining the polymer and the humectant in an aqueous medium.

In a preferred embodiment, the polymer is in the form of an aqueous emulsion of polymer particles and the adhesive composition is made by dissolving a selected amount of the humectant in the aqueous polymer emulsion.

In a highly preferred embodiment, the aqueous polymer emulsion includes from about 40 wt % to about 60 wt % polymer solids.

In a highly preferred embodiment, the polymer particles have an average particle size of from about 80 nanometers (nm) to about 1000 nm.

In a highly preferred embodiment, the pH of the aqueous polymer emulsion is adjusted to a pH of 7–9.5 by adding an effective amount of a base such as, for example, sodium hydroxide or aqueous ammonia, to the emulsion prior to addition of the humectant.

The adhesive composition of the present invention may, optionally, further include other additives known in the art such as, for example, plasticizers, emulsifiers, tackifiers, pigments, fillers, curing agents, thickeners, wetting agents, biocides, adhesion promoters, colorants, waxes and antioxidants.

An adhesive article is made by applying a coating of the adhesive composition of the present invention to a primary substrate and allowing the coating to dry, thereby providing an adhesive layer consisting of the solids portion of the adhesive composition covering a portion of the surface of the substrate.

The coating of adhesive emulsion is applied to at least a portion of at least one surface of the primary substrate by any convenient method such as, for example, roll coating, wire-wound rod coating, knife coating or curtain coating, and allowed to dry to form a dry adhesive layer on the coated portion of the surface of substrate. The adhesive emulsion may be applied as a continuous coating or a discontinuous coating on the surface of the primary substrate.

In a preferred embodiment, the adhesive emulsion is applied to a surface of the primary substrate in an amount effective to provide a dry adhesive layer 5 grams per square meter $(g/m^2)$ to 100 $g/m^2$ on the coated portion of the surface of the primary substrate.

In a preferred embodiment, the primary substrate is a sheet-like material such as, for example, a sheet of paper, a polymer film, a textile fabric or a nonwoven fiber sheet, and the adhesive article of the present invention is correspondingly a sheet-like material such as, for example, a pressure sensitive adhesive tape, a pressure sensitive adhesive label or a pressure sensitive adhesive film.

In a preferred embodiment, the adhesive article is an adhesive tape having an adhesive coated surface and an opposite non-coated surface.

In a preferred embodiment, the article includes a release layer, e.g., a polymer film, for temporarily covering the adhesive layer prior to use.

In an alternative preferred embodiment, wherein an adhesive tape is provided in the form of a concentrically wound roll, the non-coated surface of the underlying layer of tape functions as a release layer for the adhesive layer.

The adhesive composition may be applied to more than one surface of the primary substrate, for example, both sides of a strip of a polymer film may be coated to make a "double-sided" adhesive tape.

The adhesive article of the present invention is used by removing the release layer, if present, from the article and then applying an adhesive coated surface of the adhesive article to one or more secondary substrates or to one or more portions of a single secondary substrate to form a composite article wherein the substrates or primary substrate and secondary substrate portions are bonded together by an interposed dry adhesive layer.

Preferred secondary substrates include sheet-like materials such as, for example, paper products such as papers and paperboards, cardboards, corrugated cardboards, wood, metal films, polymer films and composite substrates. The terminology "composite substrates" as used herein means substrates consisting of a combination of dissimilar substrate materials such as polymer-coated paperboards or cardboards such, for example, wax-coated cardboard, and bonded wood products such as, for example, particle boards.

The adhesive layer of the adhesive article is exposed to ambient humidity during the time period between removal of a release layer and application of the adhesive article to the secondary substrate. The performance of the adhesive article of the present invention is relatively insensitive to the relative humidity of the environment in which the adhesive article is used.

EXAMPLES 1–20 AND COMPARATIVE EXAMPLES C1–C5

The adhesive compositions of Comparative Examples C1–C5 each consisted of a respective polymer emulsion.

The adhesive compositions of Examples 1–20 each consisted of a polymer emulsion and 1.5 pbw of a humectant per 100 pbw of the polymer solids of the emulsion.

The following polymer emulsions were used:

Emulsion A was an emulsion of an acrylic polymer (88.4 mole % butyl acrylate/8.7 mole % methyl methacrylate/1.45 mole % methacrylic acid/1.45 mole % acrylic acid) having a polymer solids content of 53 wt % and neutralized to a pH of 8 with sodium hydroxide;

Emulsion B was an emulsion of the same acrylic polymer used in Emulsion A, having a polymer solids content of 53 wt % and neutralized to a pH of 8 with ammonia;

Emulsion C was an emulsion of an acrylic polymer (97.1 mole % butyl acrylate/2.9 mole % methacrylic acid), having a polymer solids content of 53 wt % and neutralized to a pH of 9.5 with sodium hydroxide;

Emulsion D was an emulsion of the same acrylic polymer used in Emulsion C, having a polymer solids content of 53 wt % and neutralized to a pH of 8 with ammonia; and Emulsion E was an emulsion of an acrylic polymer (88.4 mole % butyl acrylate/8.7 mole % methyl methacrylate/2.9 mole % acrylic acid), having a polymer solids content of 53 wt % and neutralized to a pH of 8 with sodium hydroxide.

The polymer of Emulsions A and B exhibited a $T_g$ of $-36°$ C. and an acid number of 7.4.

The polymer of Emulsion C and D exhibited a $T_g$ of $-43°$ C. and an acid number of 9.3.

The polymer of Emulsion E exhibited a $T_g$ of $-36°$ C. and an acid number of 8.

The Tg values were measured using a differential scanning calorimeter (Model 12920, TA Company) by scanning the temperature range of $-100°$ C. to $+150°$ C. at a rate of $20°$ C. per minute and reporting the midpoint of the $T_g$ transition provided by the scan as the $T_g$ value for the polymer.

The acid number of the polymers was determined according to the following procedure: 50 g of emulsion of approximately 55 wt % polymer solids was diluted with 25 g of deionized water. The emulsion was deionized by introducing 30 g of an ion exchange resin (Amberlite IRN 150, Rohm and Haas Company) to the diluted emulsion and stirring the resultant mixture for 1 hour. The ion exchange resin was then filtered out of the mixture and the solids content of the deionized emulsion was determined by drying a sample of the emulsion at 150° C. for 45 minutes. 30 g of deionized emulsion was diluted with 100 g of deionized water and neutralized with sodium hydroxide to a pH of 11.5. The neutralized sample was then back-titrated with HCl to determine the equivalents of carboxyl functionality in the polymer. The titration endpoints were determined conductometrically and potentiometrically, simultaneously. The acid number was calculated from the measured solids content and the carboxyl equivalents and reported as the number of milligrams of potassium hydroxide required to neutralize 1 gram of the polymer.

The following humectants were used:

polyethylene glycol having a molecular weight of 1000 (PEG)

urea (URE);

glycerol (GLY); and triethylene glycol (TEG).

The peel strength of each of the respective adhesive compositions of Examples 1–20 and Comparative Examples C1–C5 was tested after exposure to controlled humidity according to the following procedure. A layer of adhesive composition was applied to a 0.001 inch thick corona discharge treated oriented polypropylene film and dried for 5 minutes at 150° F. to give a dry adhesive film having a thickness of about 0.001 inch. The coated side of the film was applied to a 0.001 inch thick non-treated oriented polypropylene film. The assembly so formed was held overnight at 78° F. and 50% relative humidity and then cut into I inch wide strips, each about 12 inches in length, for testing. The non-treated polypropylene film was removed from the strip. After removal of the non-treated polypropylene film, the adhesive-coated polypropylene film was conditioned at 72° C. in an environment of controlled humidity, as noted below in Table 1, for 5 to 7 minutes. Immediately following the conditioning period, the adhesive-coated side of the strip was applied to a clean stainless steel panel (2 inches by 6 inches by 0.05 inch). The strip was then rolled with a 4.5 pound roller, without applying hand pressure, and allowed to dwell for 20 minutes. the strip was then peeled off of the panel at a peel rate of 12 inches per minute using a tensile tester.

The emulsion used, the humectant used, the results of peel testing after a 5 minute exposure to 20%–25% R.H., expressed in ounces (oz), and the results of peel testing after a 5 minute exposure 45–50% R.H., expressed in ounces (oz), for each of the emulsions of Examples 1–20 and Comparative Examples C1–C5 are set forth below in TABLE 1.

TABLE 1

| Example # | Emulsion | Humectant | Peel, (oz) 5 min exposure, 20%–25% R.H. | Peel (oz), 5 min exposure, 45%–50 R.H. |
| --- | --- | --- | --- | --- |
| C1 | A | — | 14 | 57 |
| 1 | A | PEG | 27 | 54.6 |
| 2 | A | URE | 33.7 | 54.4 |
| 3 | A | GLY | 54 | 56 |
| 4 | A | TEG | 47 | 48 |
| C2 | B | — | 18 | 58 |
| 5 | B | PEG | 67 | 55 |
| 6 | B | URE | 69 | 56 |
| 7 | B | GLY | 61 | 53 |
| 8 | B | TEG | 58 | 52 |
| C3 | C | — | 13 | 21 |
| 9 | C | PEG | 21.8 | 21 |
| 10 | C | URE | 26.6 | 7.2 |
| 11 | C | GLY | 23.1 | 11.1 |
| 12 | C | TEG | 25.1 | 21 |
| C4 | D | — | 18.6 | 32 |
| 13 | D | PEG | 33.8 | 22 |
| 14 | D | URE | 33.6 | 19.8 |
| 15 | D | GLY | 28 | 16.6 |
| 16 | D | TEG | 27.4 | 23.2 |
| C5 | E | — | 16 | 50 |
| 17 | E | PEG | 23.5 | 52 |
| 18 | E | URE | 57 | 52.5 |
| 19 | E | GLY | 60 | 52 |
| 20 | E | TEG | 51 | 50 |

EXAMPLES 21–28 AND COMPARATIVE EXAMPLE C6

Emulsion A was used as Comparative Example C6. Examples 21–28 were made by combining a humectant (either triethylene glycol (TEG) or glycerol (GLY)) with Emulsion A. The relative amount of humectant used, expressed a pbw per 100 pbw polymer solids of the emulsion) is set forth below for each of Examples 21–28 and Comparative Example C6 in TABLE 2.

TABLE 2

| Example # | Emulsion | TEG (pbw per 100 pbw polymer solids) | GLY (pbw per 100 pbw polymer solids) |
| --- | --- | --- | --- |
| C6 | A | 0 | 0 |
| 21 | A | 0.5 | 0 |
| 22 | A | 1.0 | 0 |
| 23 | A | 1.5 | 0 |
| 24 | A | 3.0 | 0 |
| 25 | A | 0 | 0.5 |
| 26 | A | 0 | 1.0 |
| 27 | A | 0 | 1.5 |
| 28 | A | 0 | 3.0 |

The adhesive compositions of Examples 21–28 and Comparative Example C6 were tested after exposure to controlled humidity, as noted below in Table 3, according to the procedure disclosed above.

The adhesive compositions of Examples 21–28 and Comparative Example C6 were also tested according to a "standard" peel test that was conducted according to the method set forth above, except that the adhesive-coated polypropylene film was not conditioned in a humid environment between removal of the non-treated polypropylene film and application of the adhesive-coated polypropylene film to the stainless steel panel.

The shear strength of each of the adhesive compositions of Examples 21–28 and Comparative Example C6 was measured by Pressure Sensitive Tape Council Method 7. One end of an adhesive strip made according to the peel test method set forth above was applied to a stainless steel panel so that the strip contacted a 0.5 inch by 1 inch portion of one edge of the panel. The strip was trimmed so that only a 2 inch portion over hung the edge of the panel. The panel was hung in a position 2 degrees from vertical with a 1 kilogram weight suspended from the overhanging portion of adhesive strip. The time required for the strip to slip off the panel was measured.

The results of peel testing after a 5 minute exposure to 10%–15% R.H., expressed in ounces (oz), the results of peel testing after a 5 minute exposure 45%–50% R.H., expressed in ounces (oz), the results of "standard" peel testing, expressed in ounces (oz) and the results of shear testing, expressed in hours, for each of the emulsions of Examples 21–28 and Comparative Example C6 are set forth below in TABLE 3.

TABLE 3

| Example # | Peel (oz), 5 min exposure, 10–15% R.H. | Peel (oz), 5 min exposure, 45–50% R.H. | Peel (oz), 45–50% R.H. | Shear (hours), 45–50% R.H. |
| --- | --- | --- | --- | --- |
| C6 | 10.9 | 50.9 | 51 | 20.3 |
| 21 | 16.3 | 47.4 | 51 | 5.8 |
| 22 | 23.0 | 48.5 | 48 | 4.6 |
| 23 | 48.3 | 47.6 | 50 | 4.1 |
| 24 | 60 | 48 | 48 | 2.6 |
| 25 | 16.6 | 47.2 | 47 | 6 |
| 26 | 28.3 | 48.0 | 48 | 7.2 |
| 27 | 54.4 | 45.6 | 46 | 9.8 |
| 28 | 64 | 36 | 36 | 9.8 |

The pressure-sensitive adhesive composition of the present invention provides improved humidity response, i.e., the properties exhibited by the composition are relatively insensitive to variations in the relative humidity of the environment in which the adhesive is used.

I claim:

1. A pressure sensitive adhesive composition, consisting of from about 30 weight percent to about 70 weight percent solids in aqueous medium, said solids comprising an acrylic polymer dispersed in an aqueous medium, said polymer having a glass transition temperature of from about −25° C. to about −85° C. and an acid number of from about 3 to about 30; and from 1 part by weight to about 2 parts by weight per 100 parts polymer of a non-volatile humectant dissolved in the aqueous medium, provided that the humectant is not urea.

2. The composition of claim 1, wherein the humectant is a polyol, a sugar, a protein-based humectant or a mixture thereof.

3. The composition of claim 1, wherein the humectant is selected from the group consisting of glycerol, polyethylene glycols having a molecular weight of from about 100 to about 1000 and mixtures thereof.

4. The composition of claim 1, wherein the polymer comprises repeating units derived from a ($C_1$–$C_{20}$)alkyl (meth)acrylate monomer.

5. The composition of claim 4, wherein ($C_1$–$C_{20}$)alkyl (meth)acrylate monomer is selected from the group consisting of ethyl acrylate, butyl acrylate, 2-ethylhexyl acrylate, lauryl acrylate, cetyl acrylate, stearyl acrylate, eicosyl acrylate, methyl methacrylate, ethyl methacrylate, butyl methacrylate, isodecyl methacrylate, lauryl methacrylate, cetyl methacrylate, stearyl methacrylate, eicosyl methacrylate and mixtures thereof.

6. The composition of claim 1, wherein the polymer further comprises repeating units derived from a monoethylenically unsaturated carboxylic acid monomer.

7. The composition of claim 6, wherein the monoethylenically unsaturated carboxylic acid monomer is selected from the group consisting of acrylic acid, methacrylic acid, itaconic acid, crotonoic acid, fumaric acid and mixtures thereof.

8. The composition of claim 1, wherein the polymer has a glass transition temperature of from about −30° C. to about −65° C.

9. The composition of claim 1, wherein the humectant is selected from the group consisting of 1,3-butane diol, 1,2, 6-hexanetriol, trimethylol propane, pentaerythritol, glycerol, polyethylene glycols having a molecular weight of from about 100 to about 4000, poly(ethylene oxide/propylene oxide) copolymers, sorbitol, glucose, sucrose, corn syrup, ethoxylated (10–40 moles ethylene oxide) glycerol, ethoxylated (10–40 moles ethylene oxide) glucose, propoxylated (10–40 moles propylene oxide) glucose, hydrolyzed soy protein, soluble collagen and mixtures thereof.

10. A pressure sensitive adhesive composition, consisting of from about 30 weight percent to about 70 weight percent solids in aqueous medium, said solids comprising an acrylic polymer dispersed in an aqueous medium, said polymer having a glass transition temperature of from about −25° C. to about −85° C. and an acid number of from about 3 to about 30; and from 1 part by weight to about 2 parts by weight per 100 parts polymer of a non-volatile humectant dissolved in the aqueous medium, said composition being relatively insensitive to the relative humidity of the environment.

* * * * *